United States Patent [19]

Asano et al.

[11] Patent Number: 4,943,916
[45] Date of Patent: Jul. 24, 1990

[54] INFORMATION PROCESSING APPARATUS FOR A DATA FLOW COMPUTER

[75] Inventors: Hajime Asano, Toyonaka; Hiroaki Terada, Suita; Katsuhiko Asada, Amagasaki; Hiroaki Nishikawa, Suita; Masahisa Shimizu, Kadoma; Hiroki Miura, Hirakata; Kenji Shima, Nishinomiya; Shinji Komori, Itami; Souichi Miyata; Satoshi Matsumoto, both of Nara, all of Japan

[73] Assignees: Matsushita Electric Industrial Co., Ltd., Kadoma; Sanyo Electric Co., Ltd., Moriguchi; Mitsubishi Denki Kabushiki Kaisha, Tokyo; Sharp Corporation, Osaka, all of Japan

[21] Appl. No.: 361,701

[22] Filed: Jun. 1, 1989

Related U.S. Application Data

[63] Continuation of Ser. No. 868,706, May 30, 1986, abandoned.

[30] Foreign Application Priority Data

May 31, 1985 [JP] Japan .................. 60-119035

[51] Int. Cl.⁵ .............................. G06F 15/16
[52] U.S. Cl. .................................... 364/200
[58] Field of Search .............. 364/200; 340/825.05; 370/60, 86, 91, 94, 99

[56] References Cited

U.S. PATENT DOCUMENTS

| | | | |
|---|---|---|---|
| 4,149,240 | 4/1979 | Misunas et al. | 364/200 |
| 4,153,932 | 5/1979 | Dennis et al. | 364/200 |
| 4,156,910 | 5/1979 | Barton et al. | 364/200 |
| 4,594,653 | 6/1986 | Iwashita et al. | 364/200 |
| 4,594,655 | 6/1986 | Hao et al. | 364/200 |
| 4,594,660 | 6/1986 | Guenthner et al. | 364/200 |

*Primary Examiner*—David L. Clark
*Attorney, Agent, or Firm*—Cushman, Darby & Cushman

[57] ABSTRACT

By providing a tag data renewing unit in a data flow-computer, the "delay" function, which is necessary for a digital filter, etc., can be realized, and it is unnecessary to keep the order relation for tokens with respect to first-in/first-out, which must be kept at respective points in a conventional data flow computer, and thereby the architecture of a compiler can be simplified and at the same time the execution time can be shortened.

19 Claims, 9 Drawing Sheets

INFORMATION PROCESSING APPARATUS FOR A DATA FLOW COMPUTER

This a continuation of application Ser. No. 06/868,706, filed May 30, 1986, which was abandoned upon the filing hereof.

BACKGROUND OF THE INVENTION

1. Field of the Invention

The present invention relates to an information preocessing apparatus such as an arithmetic operation processing element of a data flow computer using the tagged token scheme. The tagged token scheme is a processing scheme in which plurality of tokens are present on one arc of a data flow graph. In order to execute instructions without confusion, tag data (identifier data) are added to respective tokens, and operations are then performed on those tokens having an identical tag as their operand data.

2. Description of the Prior Art

Computer which is based on the data flow computation model (data flow computer), is different from conventional von Neumann type computers, in that a data flow computer has no program counter. The instruction executions of such a computer are controlled in accordance with the data-driven principle that an instruction becomes executable at a point in time when data necessary for the operation, i.e., operand data, are ready. According to this data-driven principle, when a plurality of instructions exist which have become executable by the ready state of operand data the instructions, can be executed in parallel. Consequently, it is possible to realize a higher processing capability in comparison with von Neumann type computers.

FIG. 8 is a block diagram showing a general configuration of a data flow computer for performing a parallel instruction execution with three, for example, processing elements (PE). This invention also adopts the same configuration in principle. Blocks $1_1$, $1_2$ and $1_3$ designate processing elements or components. A token network 2, performs routing of tokens among processing elements $1_1$–$1_3$, or between processing elements $1_1$–$1_3$ and external parts.

FIG. 9 shows a general configuration of each of the processing elements $1_1$–$1_3$, wherein 3 designates a program memory unit, and 4 a matching unit for performing the functions of waiting for the required operand data and transmitting a set of necessary operand data to an operand data processing unit 5. Then, in the operand data processing unit 5, instructions specified by the data flow program are executed. Numeral 6 designates a network inside the processing components $1_1$, $1_2$ or $1_3$. Network 6 performs mutual information exchanges between the program memory unit 3, the matching unit 4, the operand data processing unit 5 and the token network 2.

FIG. 10 is a signal flow graph of a fourth order digital filter. In FIG. 10, X designates an input, Y designates an output, and $7_1$, $7_2$, $7_3$, $7_4$ and $7_5$ show multiplications with coefficients $A_0$, $A_1$, $A_3$ and $A_4$, respectively. Additions are shown at $8_1$, $8_2$, $8_3$ and $8_4$ and $9_1$, $9_2$, $9_3$ and $9_4$ show delays.

A method to realize a fourth order digital filter by a data flow computer is explained as follows.

FIG. 11 shows a resultant data flow graph made by converting a program of the following algorithm for the fourth order digital filter of FIG. 10 by a compiler:

$$Y_{i-4} = A_4 X_{i-4} + A_3 X_{i-3} + A_2 X_{i-2} + A_1 X_{i-1} + A_0 X_i$$

wherein respective nodes correspond to instructions of a data flow computer, and data are carried out tokens which move on arcs connecting the nodes. In a conventional data flow computer, in order to realize the delay in FIG. 10, the necessary number of dummy tokens DT shown by solid circles in FIG. 11 are prepared beforehand on the nodes which require any number of dummy tokens. The positioning of these dummy tokens DT is determined at the time when the compiler converts the program into a data flow graph. (e.g. See for example, the seminar note, "Study on Latest Image Processing Processors and Development EXamples of their Application System", published by Japan Industry Engineering Center, p.46).

In order to realize the delay by using the dummy tokens as described above, the order of those tokens must be kept unchanged on respective arcs of the data flow graph. That is, tokens issued from a node must reach a destination node, keeping the same order in which they were issued. Additionally, the order of instructions shown on the node execution must keep the proper order relation with respect to first-in/first-out. Also from the point of view of constructing a data flow computer, it is necessary to have the limitation that the first-in/first-out order relation must be kept at all the positions of each relevant unit such as the token network 2, the network 6 inside the processing clement, the program memory unit 3, the matching unit 4, and the operand data processing unit 5.

The prior art apparatus has another difficult, as has been described, namely that at the time the compiler converts a program into a data flow graph, the conversion into a data program becomes possible only after the detection of the nodes at which dummy tokens must be positioned and the detection of the number of the required dummy tokens. This makes the configuration of the compiler complex. Furthermore, for execution of a program it has been necessary to position dummy tokens prior to the execution. Accordingly, additional structure for accomplishing this must be prepared in a data flow computer. And further, from the point of view of execution time of a program considerable time must be expanded to position the dummy tokens.

OBJECT AND SUMMARY OF THE INVENTION

This invention has been made to obviate the above-described difficulties, and describes an information processing apparatus wherein the delay function can be realized without regard to the order relationship of tokens. And further, the configuration of a compiler can be simplified, thereby enabling a decrease of the program execution time.

The apparatus in accordance with the present invention comprises at least one processing element, wherein tokens, each of which has tag data determined in accordance with a predetermined relation to a numerical sequence, are inputted in the information processing apparatus sequentially with respect to time and information processing is performed and instructions are executed with respect to the tokens.

The information processing element comprises
a program memory unit for storing a data flow program, a matching unit in which operand data are paired, an operand data processing unit wherein instructions specified by the data flow program are executed with respect to those operand data given by said matching unit and a tag data renewing unit for renewing tag data of the foregoing or predecessor token to the same values as those of the tag data of the following or predecessor tokens inputted after those foregoing tokens.

As has been described above, according to the information processing apparatus of the present invention, a plurality of tokens which have tag data varying in a predetermined relation to a numerical sequence, are inputted one after another sequentially in time, and the information processing is performed in the data flow computation scheme with respect to said plural tokens. And, by means of the tag data renewing unit, the tag data of the predecessor tokens among said plurality of tokens are renewed to the same values as those of the tag data of following or the successor tokens inputted after those foregoing tokens. Consequently, by pairing operand data of the above-mentioned following tokens with operand data of predecessor tokens having renewed tag data, those two-operand upon data are operated. Accordingly, said operand data of predecessor tokens having the renewed tag data are delayed until an appearance of those operand data of said successor tokens, thereby enabling a realization of the delay function.

As a result of the realization of the delay function by renewing the tag data of predecessor tokens as has been described above, hitherto required considerations for preserving the order relation of first-in/first-out become unnecessary at any position of processing elements or, as a whole, in a data flow computer. Therefore, an improvement of flexibile construction of the processing elements is obtainable. Furthermore, when a compiler converts a program into a data flow graph, a compilation becomes possible without giving any consideration to the orderly positioning of tokens, and thereby the configuration of a compiler becomes simplified. Furthermore, since any preprocessing for the positions of dummy tokens becomes unnecessary, program execution time can be shortened.

BRIEF DESCRIPTION OF THE DRAWINGS

FIG. 5A is a detailed circuit diagram of an example of tag data decrementer used in the embodiment of FIG. 4A.

DESCRIPTION OF THE PREFERRED EMBODIMENTS

Figure 1:
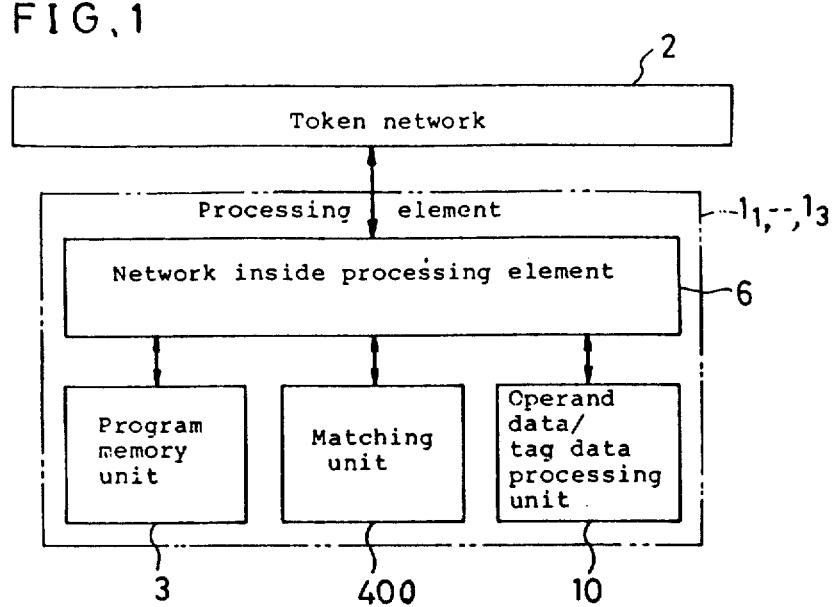
FIG. 1 is a block diagram of a first embodiment of a processing element embodying the present invention.

FIG. 1 shows a general configuration of each of the processing elements or components $1_1-1_3$ in accordance with the present invention. Therein, 3 designates a program memory unit, and 400 a matching unit for performing functions to carry out the matching of operand data and to transmit a set of necessary operand data to an operand data and tag processing unit 10. In this operand data and tag processing unit 10, instructions specified by the data flow program are executed, and furthermore, apart from the operand data processing unit 5 of FIG. 9, this unit 10 further performs the function of increasing the tag data by a value of one, that is, the function of executing the delay instruction is added. Unit 6 designates a network inside the processing components $1_1$, $1_2$ or $1_3$. The network 6 performs mutual information exchanges between the program memory unit 3, the matching unit 400, the operand data and tag data processing unit 10 and the token network 2.

Figure 2:
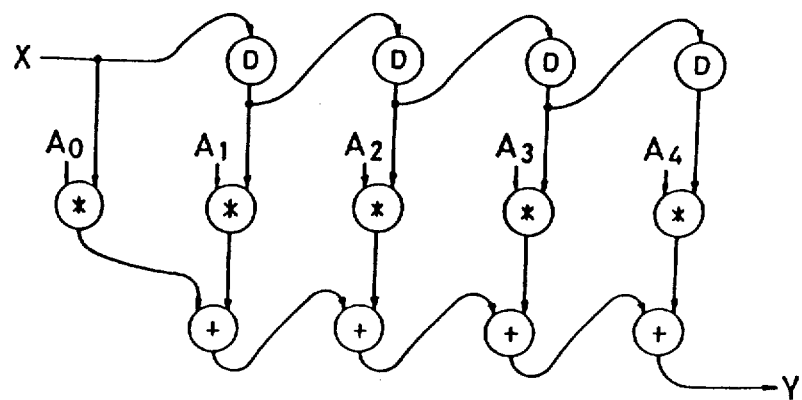
FIG. 2 is an example of data flow graphs executed in the above-mentioned embodiments of this invention.
Figure 9:
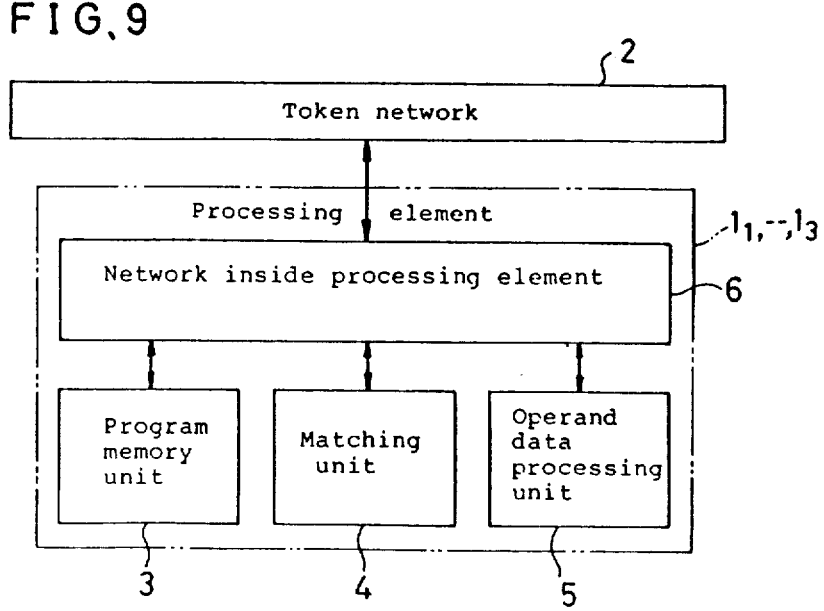
FIG. 9 is the block diagram of a conventional processing element.
Figure 10:
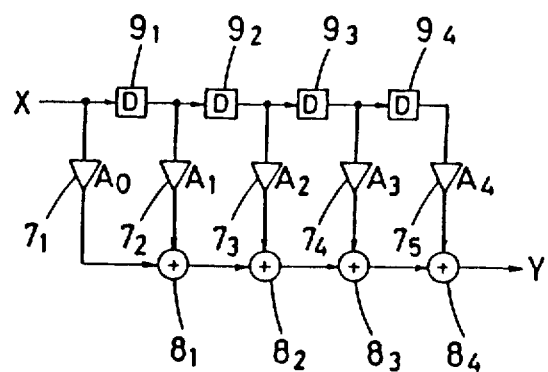
FIG. 10 is the signal flow graph of a general fourth order digital filter.
Figure 11:
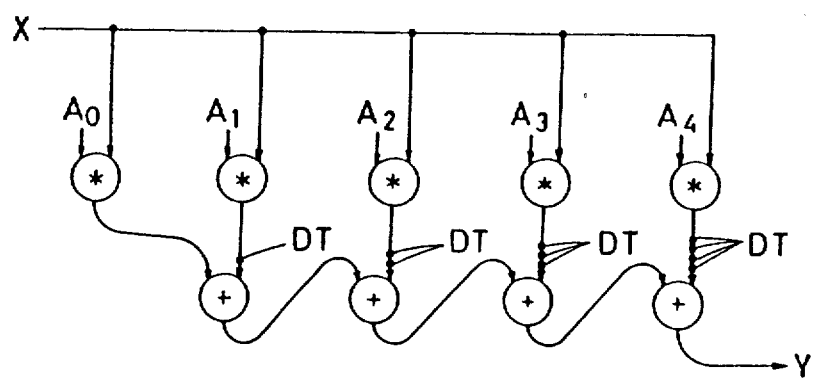
FIG. 11 is an example of data flow graph executed by the conventional processing element.

FIG. 2 shows a resultant data flow graph to be executed by a data flow computer in accordance with this invention. The data flow graph is a result made by converting a program of the following algorithm for the fourth order digital filter of FIG. 10 by a compiler:

$$Y_{i-4}=A_4\cdot X_{i-4}+A_3\cdot X_{i-3}+A_2\cdot X_{i-2}+A_1\cdot X_{i-1}+A_0\cdot X_i,$$

wherein respective nodes correspond to instructions of the data flow computer, and data (called tokens) move on arcs connecting the nodes. A difference between the data flow graph of FIG. 2 and that of FIG. 11 is that an instruction for performing the delay (a node indicated by D, hereinafter called a delay instruction) was added and that dummy tokens become unnecessary. In order to realize the delay intended by the tagged token scheme, tag data having the order relation (prescribed numerical sequence relation) are associated to the values of input data X. That is, if the input data are inputted, for example, so as to associate tag data whose values increase by a value of one, each in accordance with the order of input the delay can be realized by the execution of the instruction to increase the tag data value by one. As a result, by delaying the operand data of preceding predecessor tokens whose tag data increases by one, operations can be made with operand data of those following or successor tokens which are inputted afterwards but whose tag data agree with those of the former. In the event that the input data are inputted so as to associate tag data whose values decrease by one, each in accordance with the order of input, the delay can be realized by the execution of an instruction for decreasing the value of tag data by one. And the difference in the increment or decrement of the above mentioned tag data values is not necessarily limited to one, but values of two or more can also be possible. The difference of the present invention in comparison with the prior art is described below. In the prior art wherein the tagged token scheme was not employed, that is, when the data flow graph of FIG. 11 was executed without use of the tagged token, the matching unit 4 of FIG. 9 is a unit for performing a function such that those tokens having the same destinations were mutually matched, i.e., those tokens directed to the same instruction were matched, thereby conbining them into one token. Whereas the matching unit 400 of FIG. 1 of the present invention is a unit for performing the function of mutually matching those tokens whose destinations and tags are both the same to thereby combine such matched tokens into one token.

Figure 3:
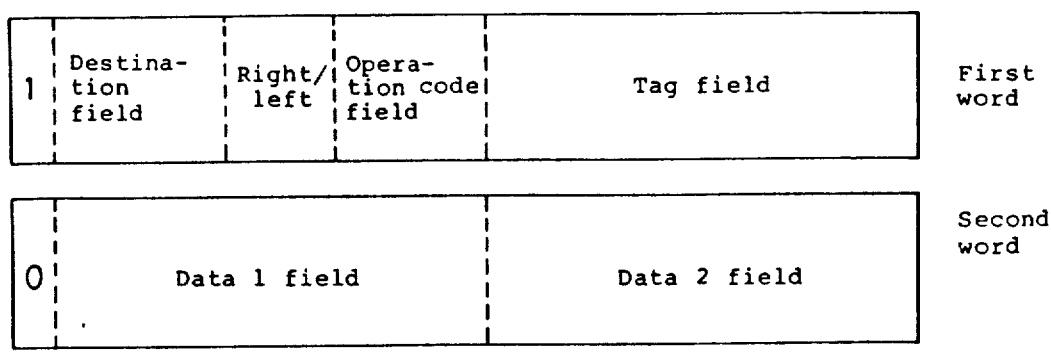
FIG. 3 is a diagram showing a field configuration of a token in the above-mentioned embodiment.

FIG. 3 shows an example of a field configuration of tokens used in the token network 2, and tokens having the same configuration are to be used for communication in the network 6 inside the processing element.

The operation of the processing element of FIG. 1 is briefly explained as follows.

Those tokens inputted into the processing element from the token network 2 are first classified by the network 6 inside the processing element. When the contents of the fourth field of the first word, i.e., of the operation code field correspond to a single-operand instruction, matchings among the operand data are not necessary and hence those operand data are sent directly to the operand data & tag data processing unit 10. When the contents of the operation code field are those corresponding to a two-operand instruction, they are sent to the matching unit 400. Since the delay instruction is a single-operand instruction, it is sent directly to the operand data & tag data processing unit 10. For example, in the case of two-operand instruction, matching is made such that two received tokens are characterized in that both the contents of the second field of the first word, i.e., contents of the destination field, and the content of the fifth field of the first word, i.e., contents of the tag field, agree with each other. Next, the content of the second field of the second word, i.e., the content of the data 1 field of the second word of such token whose third field (consisting of a bit) of the first word is "right" is stored in the third field of the second word i.e., the data 2 field of the second word of such token wherein the third field (bit) of the first word is "left". This combined token is transmitted to the operand data & tag data processing unit 10, through the network 6 inside the processing element.

In the operand data & tag data processing unit 10, operations are processed on those received tokens. That is, when the content of the fourth field of the first word of the received token is corresponding to a single-operand instruction, single-operand operations corresponding to the content of the operation code field are processed on the content of the second field of the second word, i.e., on the content of the data 1 field. Resultant data thus obtained are written in the second field of the second word, i.e., the data 1 field of the second word. Then, the resultant token is transmitted to the program memory unit 3 through the network 6 inside the processing element. When the content of the operation code field of a recieved token corresponds to a two-operand operation, a two-operand operation corresponding to the content of the instruction code field is processed on the contents of the second and the third fields of the second word, i.e, of the data 1 field and the data 2 field of the second word. The resultant data are written in the second field of the second word, i.e., the data 1 field of the second word. Then, the resultant token is transmitted to the program memory unit 3 through the network 6 inside the processing element. In the event that the content of the operation code field of a received token corresponds to the delay instruction, the content of the firth field of the first word, i.e., the content of the tag field is increased by one, and the resultant data are written into the tag field again. Then the token transmitted to the program memory unit 3 through the network 6 inside the processing element.

In the program memory unit 3, the contents of program memory are read out by utilizing the content of the second field of the first word, i.e., of the destination field of the received token as an address. The content of the second and the third fields of the first word of the received token and the content of the fourth field of the first word are renewed, and the obtained token is again transmitted to the network 6 inside the processing element. With respect to the network 6 inside the processing element, in the event that the content of the second field of the first word of the received token, i.e., the content of the destination field corresponds to an instruction external to the present processing element, it is transmitted to the relevant processing element through the token network 2. In cases other than the above, the foregoing operation is repeated.

In this embodiment, it is not necessary to keep the order relation of first-in/first-out on all the constituent elements of a data flow computer. Consequently, not only is the flexibility of a constituting a computer is improved, but also the realization of delay in the tagged token scheme becomes possible by reason of a simplified architecture.

Figure 4:
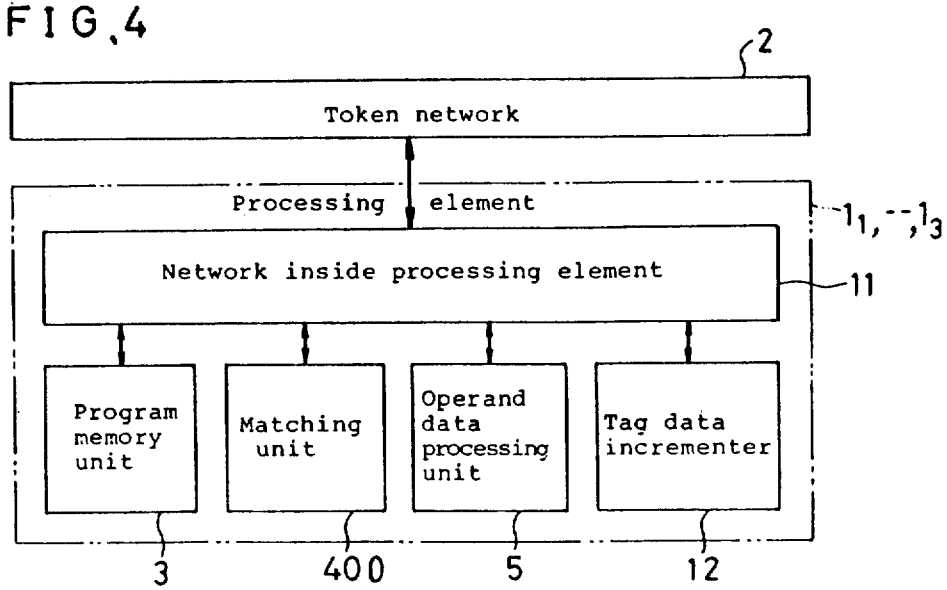
FIG. 4 is a block diagram of a second embodiment of a processing element embodying the present invention.

A second embodiment of a processing element of this invention is shown in FIG. 4. This is an example constituted in such a manner that the functions of the operand data & tag data processing unit 10 in FIG. 1 are separated into two parts, namely, an operand data operation unit 5 and a tag data incrementer 12, thereby enabling independent execution of operation instructions processed on ordinary operand data and delay instructions processed on tag data. It is assumed that for communication inside the processing element, the tokens shown in FIG. 3 are used. Operation of the embodiment of FIG. 4 is almost same as that of the first embodiment, the only difference is that the points of execution of the operation instructions on ordinary operand data and of the delay instructions are separated physically into two locations. As a result, the structure consitution of a network 11 inside the processing element is a five input five output arrangement, being different from the network 6 inside the processing element which has a four input, four output structure.

Figure 4A:
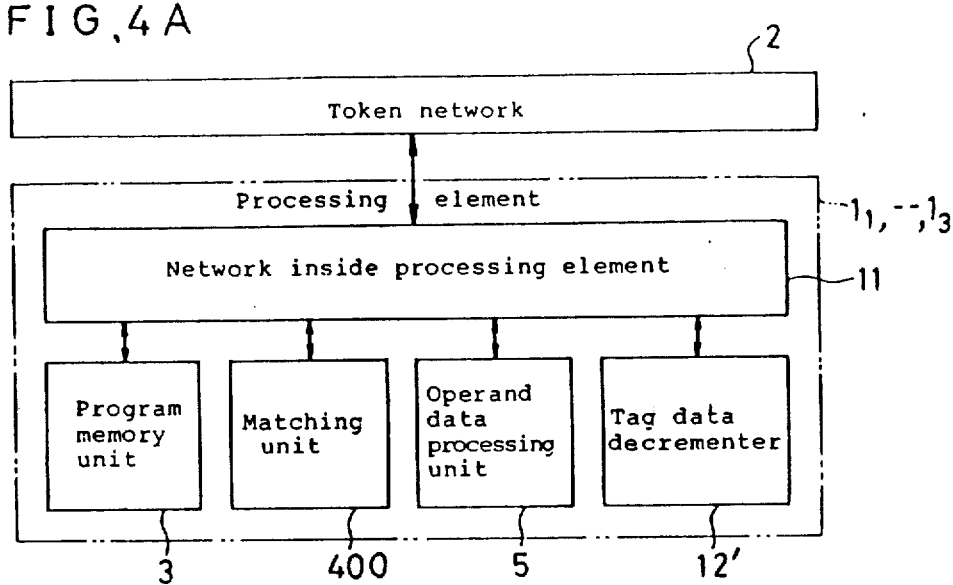
FIG. 4A is a block diagram of a modified version of the second embodiment of the processing element.

FIG. 4A is a modified example of a processing element embodying the present invention, wherein a tag decrementer 12' is used in place of a tag incrementer 12 of FIG. 4. Other parts and function are similar to the case of FIG. 4.

Figure 5:
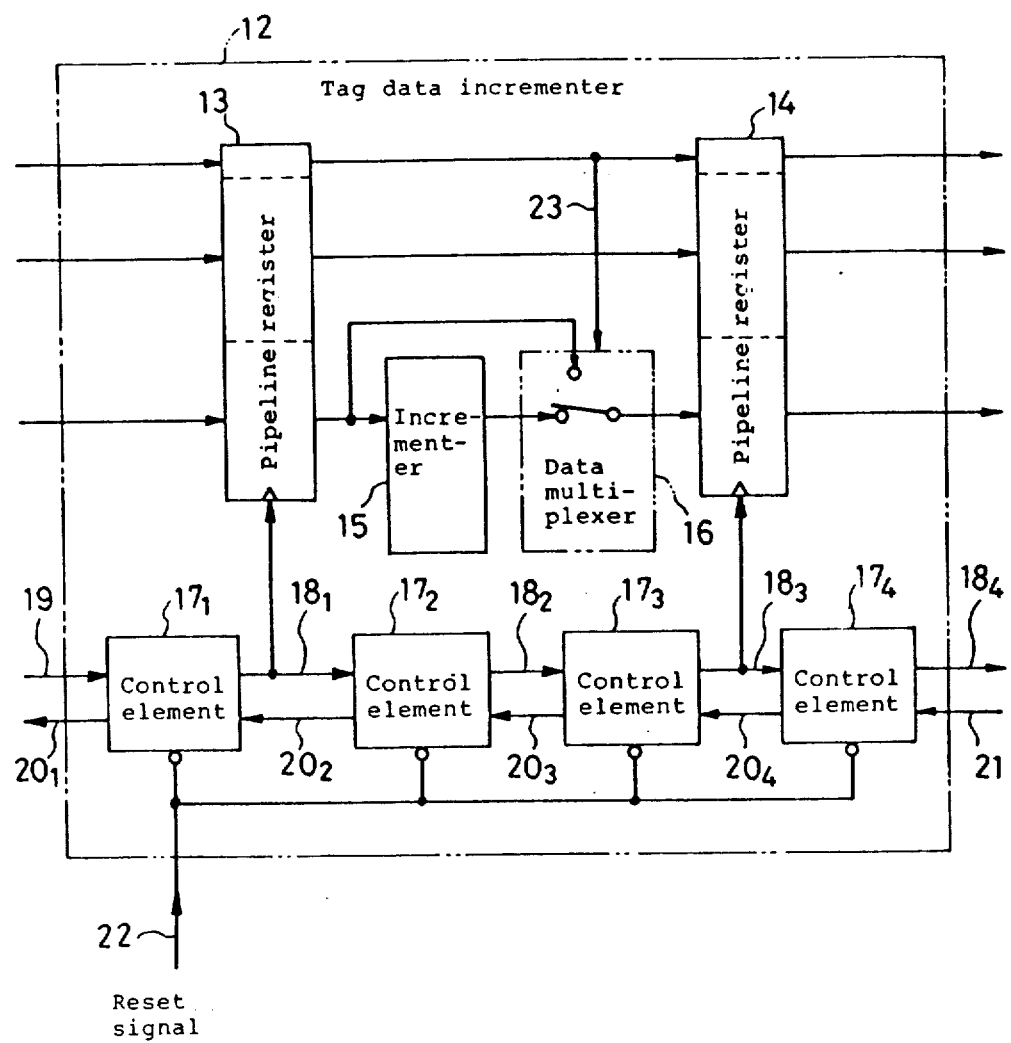
FIG. 5 is a detailed circuit diagram of an example of tag data incrementers used in the embodiment of FIG. 4.
Figure 6:
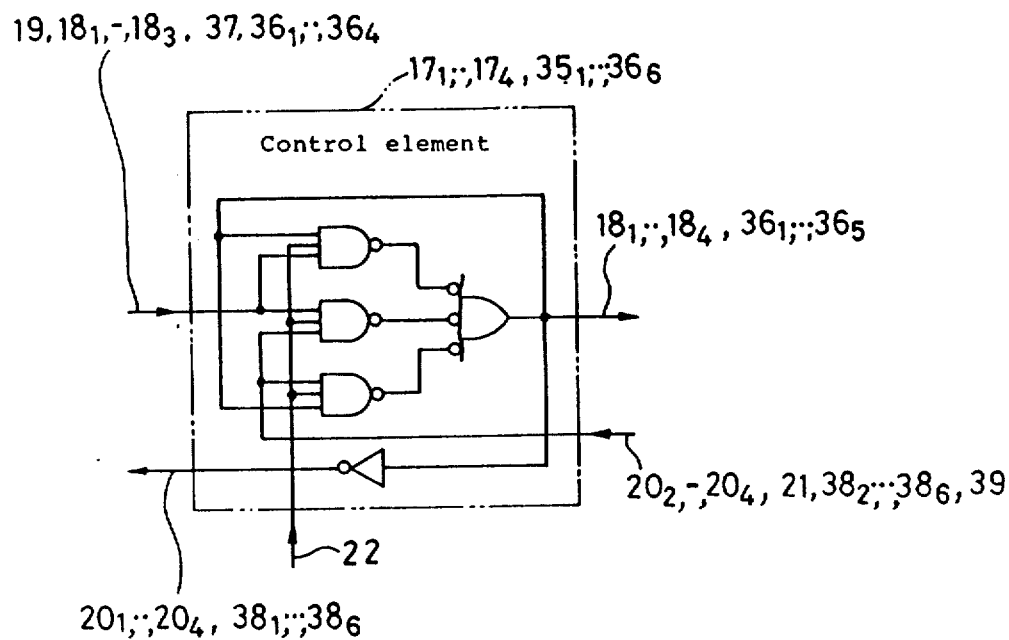
FIG. 6 is a detailed circuit diagram of a control element in FIG. 5.

FIG. 5 is a detailed diagram of an embodiment of the tag data incrementer 12 in this second embodiment. Therein, an incrementer 15 increments input data values by one, thus it is possible to employ, for example, a structure using a ROM (Read Only Memory), wherein input data are inputted through address lines of the ROM and output data are taken out from data lines of the ROM. Though the above-mentioned case wherein the incrementer 15 increments values incremented by one, the increase of a value is not necessarily limited to one, but may be arbitrary numbers which comprise a certain numerical sequence. Thus, on respective addresses of the ROM, values that are written which equal to address values plus one are. A data multiplexer 16 is used to write the output values of the incrementer 15 into the fifth field of the first word, i.e., into the tag field, of the tokens. Pipeline registers 13 and 14 which perform the execution of the delay instruction in the pipeline processing scheme (usually known as pipelining) are controlled through control elements $17_1$ through $17_4$. A detailed drawing of those control elements is shown in FIG. 6. These control elements $17_1$ to $17_4$ comprise a widely known technique usually referred to as the C-elements of Muller.

A method of initialization on the tag data incrementer 12 of FIG. 5 is explained as follows: The initialization is completed by setting the reset signal 22 to logic "0". Here, logic "0" means a low level of voltage typically between $-0.5$ and $+0.4$ V. and logic "1" means a high level of voltage typically between $+2.4$ to $+5.5$ V. At this time, signals $18_1$ through $18_4$ become logic "0", and their logically inverted responding signals $20_1$ through $20_4$ become logic "1". Accordingly, the initialization is completed, and the preparation for receiving the input of tokens requesting the execution of a delay instruction is also completed.

Next, with reference to FIG. 5, a method of execution of the delay instruction is explained. The execution of the delay instruction begins with the input of tokens. That is, when the responding signal $20_1$ is logic "1", the first word of a token is inputted from the network 11 inside the processing element to the input of the pipeline register 13, thereby switching the input request signal 19 to logic "1". At this time, the control element $17_1$ checks whether the responding signal from the succeeding stage $20_2$ is logic "1", and when it is logic "1" the signal $18_1$ becomes a logic "1". That is, only when both the input request signal 19 and the responding signal from the succeeding stage $20_2$ are logic "1", is the signal $18_1$ switched from logic "0" to logic "1". And only when the input request signal 19 and the responding signal $20_2$ are logic "0", is the signal $18_1$ switched from logic "1" to logic "0". Thus, the responding signal $20_1$ is a signal which is a logical inversion of the signal $18_1$. The above-mentioned operation is common for all of the control elements $17_1$ through $17_4$.

As a result of the switching of the signal $18_1$ from "0" to "1", the first word of a token is latched to the pipeline register 13. This latched first word is next latched to the pipeline register 14 by the similar action of the control elements $17_2$ and $17_3$. And at this time, a data multiplexer 16 sets a data path as shown in FIG. 5. Incrementer 15 affects only the value of the fifth field of the first word of the token, i.e., the value of the tag field of the first word becomes a value incremented by one and then is latched. Thereafter, the input of the second word becomes possible (at this moment the responding signal $20_1$ is logic "1"), and thus the second word is inputted in a similar manner as the first word. The output of the first word latched to the pipeline register 14 is effected when the signal $18_4$ is logic "1", and then the network 11 inside the processing element is in the input-ready state (at this moment the responding signal 21 is logic "1"), while network 11 is not in the input-ready state it keeps the latched data in the pipeline register 14.

With respect to second word of the token, the data multiplexer 16 routes signals by means of a switch as shown in FIG. 5 which is activated by a signal 23. Accordingly, the second word is latched to the pipeline register 14 without any modification of its contents and the second word is then issued to the network 11 inside the processing element in a similar manner as the first word.

A modification of the tag data incrementer 12' of the circuit of FIG. 4A is structured as shown in FIG. 5A, wherein a decrementer 15' is used in place of the incrementer 15 of FIG. 5 to constitute a tag decrementer 12'. Other parts and function are similar to the case of FIG. 5.

Figure 7:
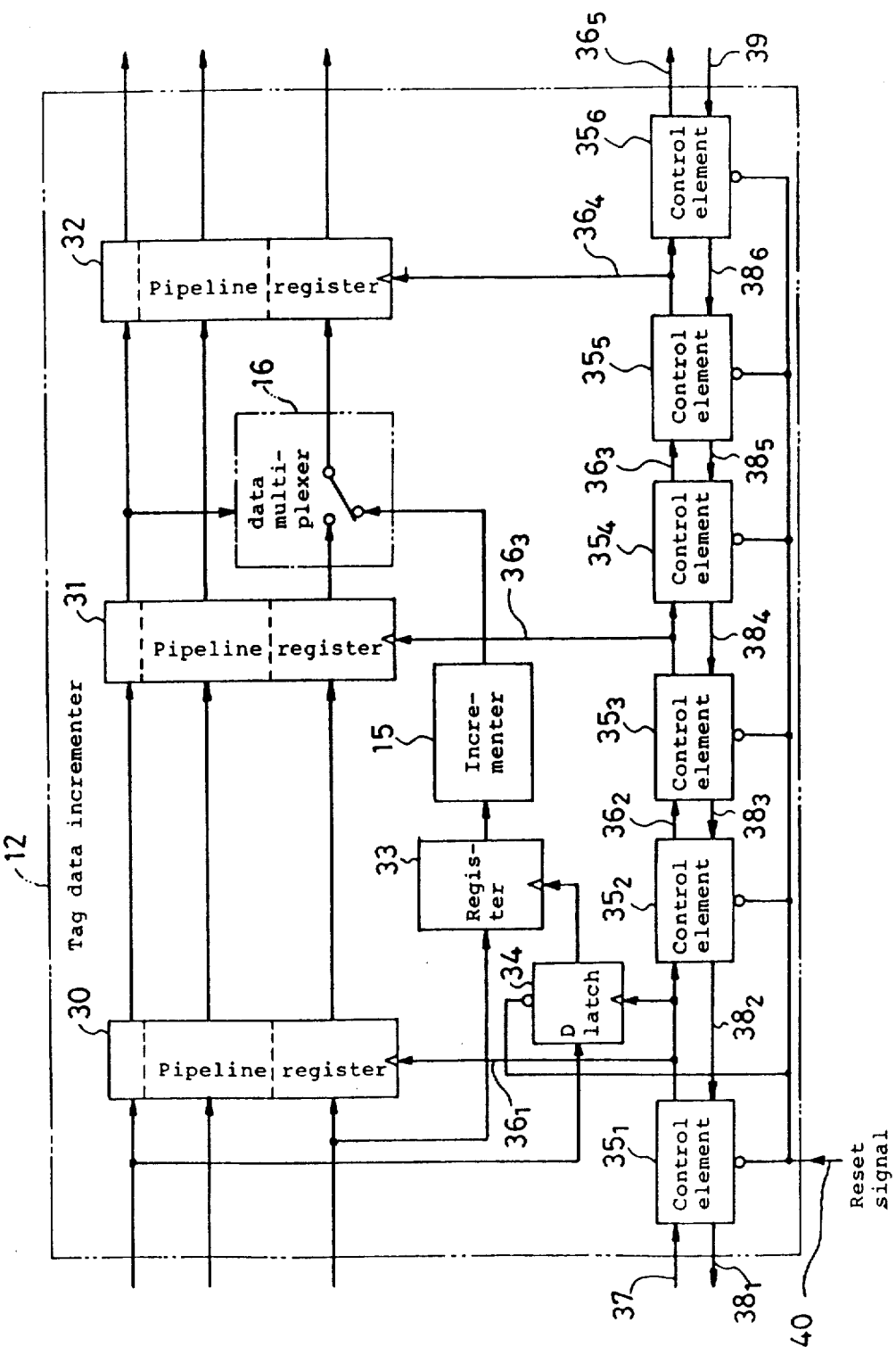
FIG. 7 is a detailed circuit diagram of an example of tag data incrementers used in FIG. 4.
Figure 7A:
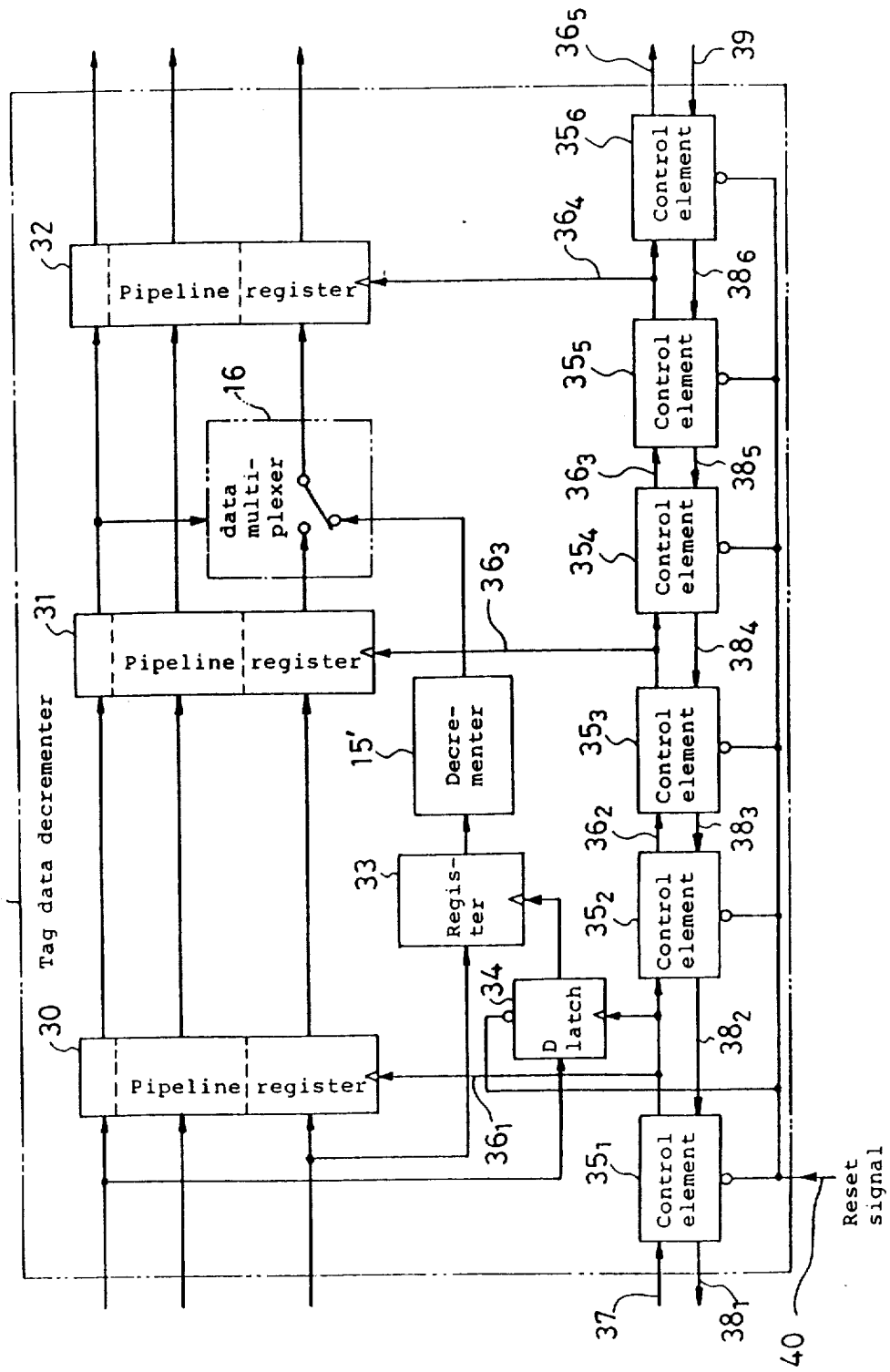
FIG. 7A is a detailed circuit diagram of an example of tag data decrementers used in FIG. 4A.
Figure 8:
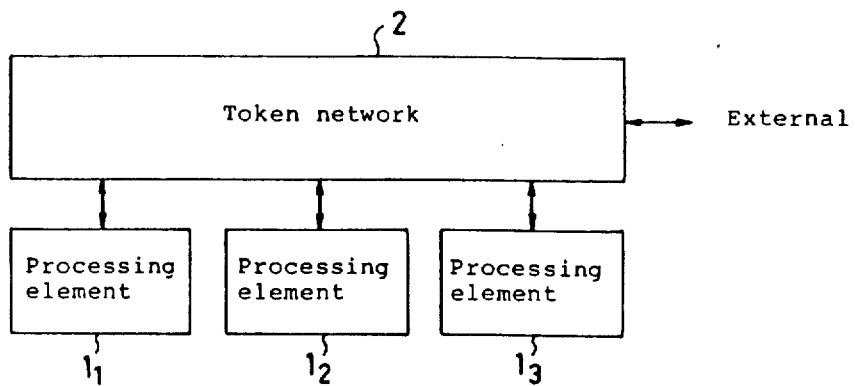
FIG. 8 is the block diagram of a general data flow computer.

Another embodiment of the tag data incrementer 12 is shown in FIG. 7. In the configuration of the tag data incrementer shown in FIG. 5, the incrementer 15 and the data multiplexer 16 are inserted in series on the data path between two pipeline registers 13 and 14. Accordingly, there is a possibility of a decrease in the pipeline processing rate due to the delay time of the pipeline registers. This problem can be solved by removing the incrementer 15 from the data path between two pipeline registers 31 and 32 and inserting only the data multiplexer 16 on the data line between the pipeline registers 31 and 32, as shown in the configuration of FIG. 7.

A modified embodiment of the tag data decrementer is shown inFIG. 7A, wherein a decrementer 15' is used to constitute a tag data decrementer 12'.

In the following, a further detailed explanation is given on the above-mentioned measure for preventing a possible decrease in the pipeline register delay time. Numerals 30, 31, and 32 designate pipeline registers, numeral 33 designates a register for holding the fifth field of the first word, i.e., holding the value of the tag field, and 34 is a D-latch holding vlaue of the first field of the first or second words.

Control elements $35_1$ through $35_6$ have the same configuration as that of the control elements $17_1$ through $17_4$. Numeral 37 designates an input requesting signal, numerals $38_1$ through $38_6$ and 39 designate responding signals, numeral 40 designates a reset signal, numerals $36_1$ through $36_5$ designate output requesting signals, numeral 15 designates an incrementer, and numeral 16 designates a data multiplexer.

In this embodiment, tag value of a token is held by the register 38. Then the contents are increased by one by the incrementer 15, and the resultant value is returned into the token as a renewed tag value.

Although the above explanation has been given taking an example wherein the tokens are of two-word configuration, this invention also can be applied to a configuration which includes three or more words with little modification. Further, it can also be applied to an one-word configuration case. In such a one-word configuration case, data multiplexer 16 becomes unnecessary and hence the configuration is much simplified.

In the second embodiment, similarly as in the first embodiment, there is no need to require all of those component elements in a data flow computer to keep the order relation of first-in and first-out. Thus, more flexible configurations become possible. Furthermore, different from the first embodiment, it is possible to execute the delay instruction and other instructions independently, which enables configuration of a processing element of a high processing capability.

What is claimed is:

1. In a data flow computer wherein operand data and tag data are carried on tokens flowing in a token network, an information processing apparatus having an input port and an output port comprising:
at least one processing component connected with said token network, wherein tokens each of which has tag data determined according to a predetermined numerical sequence are input in said input port of said information processing apparatus sequentially in time and instructions are executed with respect to said tokens when operand data are in a state of readiness, said information processing component comprising:

a program memory unit connected with said token network for storing a data flow program including execution instructions embodied therein, a matching unit connected with said memory unit in which operand data are matched, an operand data processing unit connected with said matching unit wherein instructions fetched from said program memory are executed using those operand data matched by said matching unit, and a tag data renewing unit connected to said operand data processing unit for renewing tag data of predecessor tokens having been operated on, to the same values as those of tag data of successor tokens input after those predecessor tokens.

2. In a data flow computer, an information processing apparatus having an input port and an output port comprising a token network and a plurality of information processing components, each having a connection with said token network, wherein tokens, each of which has tag data determined according to a numerical sequence, are input in said input port of said information processing apparatus sequentially with respect to time, and instructions are executed with respect to said tokens, when operand data carried on said tokens are in a state of readiness, said token network being connected with said input port and said output port and having functionality of communication among said information processing components, said input port and said output port passing said input tokens or tokens issued from said information processing components as processed tokens, each of said information processing components comprising;

a program memory unit connected to said token network for storing a data flow program including a set of instructions, a matching unit connected with said memory unit in which operand data are matched, an operand data processing unit connected with said matching unit wherein instructions fetched from said program memory unit are executed using those operand data treansmitted by said matching unit; and a tag data renewing unit for renewing tag data of predecessor tokens having been operated on to the same values as those of tag data of successor tokens input in said input port of said data processing apparatus after those predecessor tokens.

3. An information processing apparatus in accordance with claim 1 or 2, wherein said matching unit includes means for matching two tags wherein both their destinations and tag data are equal to each other, and means for synthesizing said tags into a single token.

4. An information processing apparatus in accordance with claim 1 or 2, further comprising a network connected with said token network for classifying and sending input data transmitted from said token network to either said program memory unit, said matching unit or said operand data processing unit.

5. An information processing apparatus in accordance with claim 1 or 2, wherein said tag data renewing unit is a tag data incrementer or decrementer for issuing values associated with input data, said values being increased or decreased, respectively, according to a predetermined numerical sequence.

6. An information processing apparatus for a data flow system wherein data and execution instructions are carried on tokens moving in a token network, said information processing apparatus having an input port and an output port, and comprising at least one information processing component, wherein tokens each of which has tag data determined according to a predetermined numerical sequence are input in said processing apparatus sequentially with respect to time and instructions are executed with respect to said tokens when operand data in a state of readiness, said information processing component comprising;

a program memory unit connected with said token network for storing a data flow program including execution instructions, a matching unit connected with said program memory in which operand data are matched, operand data processing means connected with said matching unit, for executing instructions fetched from said program memory using those operand data transmitted by said matching unit; and tag data processing means, for renewing tag data of predecessor tokens to same values as those of tag data of successor tokens input after those predecessor tokens.

7. An information processing apparatus having an input port and an output port for a data flow system, wherein execution instructions and data are carried on tokens, comprising a token network and a plurality of information processing components connected with said token network, wherein tokens, each of which has tag data determined according to a numerical sequence are input in said input port of said processing apparatus sequentially with respect to time and instructions are executed with respect to said tokens when operand data are in a state of readiness, each of said information processing components comprising;

a program memory unit connected with said token network for storing a data flow program, including execution instructions, a mnatching unit connected with said memory unit in which operand data are mnatched, operand data means connected with said matching unit, for executing instructions fetched from said program memory using those operand data transmitted by said matching unit, and tag processing means for renewing tag data of predecessor tokens among said plurality of tokens to same values as those successor tokens.

8. An information processing apparatus in accordance with claim 6 or 7, wherein;

said matching unit includes means for matching at least two tag data wherein both the destination and tags are equal to each other, and synthesizing into a single token.

9. An information processing apparatus in accordance with claim 6 or 7, wherein;

said processing component further comprises a network for classifying and sending input data transmitted from said token network to determine whether respective data are to be sent to said program memory unit, said matching unit or said operand data and tag data operation unit.

10. In a dataflow computer, an information processing which has at least one input port and at least one output port and wherein tokens each having tag data determined according to a predetermined numerical sequence are input into said input port sequentially with respect to time and instructions and are excuted with respect to said input tokens according to a dataflow computation scheme which enables instructions to be executed whenever operand data needed for the execution are in a state of readiness, comprising:
an information processing component connected with said input port and said output port,
said information processing component including a plurality of units, comprising:
a program memory unit which has communication paths connected from an input port of said information processing component, to output port of said information processing component, or with others of said plurality of units of said information processing component, for storing a data flow program including execution instructions embodied therein,
a matching unit which has communication paths connected with an input port of said information processing component, with an output port of said information processing component, or with others of said plurality of units of said information processing component, wherein operand data that are referred to in an execution of an instruction and which have respectively same values of tag data indicatiing they are in a common context of a program execution are matched, paired, and issued to another of said plurality of units of said information processing component,
an operand data processing unit, which has communication paths connected with an input port of said information processing component, with an output port of said information processing component, or with others of said plurality of units of said information processing component, wherein instructions fetched from said program memory unit are executed using those operand data paired by and issued from said matching unit except when no pairing is needed in executing a single operand instruction, and
a tag data renewing unit, which has communication paths connected with an input port of said information processing component, with an output port of said information processing component, or with others of said plurality of units of said information processing component wherein tag data of predecessor tokens having been operated on are renewed to a same value as that of at least one successor token input after those predecessor tokens according to said predetermined numerical sequence.

11. In a dataflow computer, an information processing apparatus, which has at least one input port and at least one output port, and wherein tokens each having tag data determined according to a predetermined numerical sequence are input into said input port sequentially with respect to time and instructions are executed with respect to said input tokens according to a data flow computation scheme which enables instructions to be executed whenever operand data needed for the execution are in a state of readiness, comprising:
a token network, and
a plurality of information processing components, which are connected with said token network and which issue tokens,
said token network being connected with said input port and said output port and including means for communicating among said plurality of information processing components, said input port and said output port to pass at least one of said input tokens or tokens issued from said information processing components as processed tokens,
each of said information processing components comprising a plurality of units including:
a program memory unit which has communication paths connected from an input port of said information processing component, to an output port of said information processing component, or with others of said plurality of units of said information processing component, for storing a data flow program including execution instructions embodied therein,
a matching unit which has communication paths connected with an input port of said information processing component, with an output port of said information processing component, or with said other units of said information processing component, wherein operand data that are referred to in an execution of an instruction and which have a same value of tag data indicating they are in a common context of program execution are matched, paired and issued to another of said plurality of units of said information processing component,
an operand data processing unit, which has communication paths connected with an input port of said information processing component, with an output port of said information processing component, or with others of said plurality of units of said information processing component, wherein instructions fetched from said program memory unit are executed using those operand data paired by and issued from said matching unit except when no pairing is needed in executing a single operand instruction, and
a tag data renewing unit which has communication paths connected with an input port of said infomation processing component, with an output port of said information processing component, or with others of said plurality of units of said information processing component, wherein tag data of predecessor tokens having been operated on are renewed to a same value as that of at least one successor token input after those predecessor tokens according to said predetermined numerical sequence.

12. An information processing apparatus in accordance with claim 10 or 11, wherein
said matching unit includes means for matching and pairing two operand data input into said matching, each of which has a common destination and a same value of tag data as the other and means for synthesizing into a single processible data from including a pair of said operand data, said common destination, said common tag and issuing said processible data form.

13. An information processing apparatus in accordance with claim 10 or 11, wherein
each said information processing component includes an internal network for communication among (a) said token network outside of said information processing component and said matching unit, said operand data processing unit and said matching unit, (c) said operand data processing unit and said program memory unit, and (d) said tag renewing unit and said program memory unit, inside of side information processing component.

14. An information processing apparatus in accordance with claim 10 or 11, wherein
said tag data renewing unit is a tag data incrementer for incrementing a value of tag data of input data form issued from another of said plurality of units of said information processing component to said tag renewing unit according to said predetermined numerical sequence and issuing a data form having an incremented value of tag data.

15. An information processing apparatus in accordance with claim 10 or 11, wherein
said tag data renewing unit is a tag data decrementer for decrementing a value of tag data of input data form issued from another of said plurality of units of said information processing component to said tag data renewing unit according to said predetermined numerical sequence and issuing a data form having a decremented value of tag data.

16. In a dataflow computer, an information processing apparatus which has at least one input port and at least one output port and wherein tokens each having tag data determined according to a predetermined numerical sequence are input into said input port sequentially with respect to time and instructions are executed with respect to said input tokens according to a dataflow computation scheme to enable instructions to be executed whenever operand data needed for the execution are in a state of readiness comprising:
an information processing component connected with said input port and said output port,
said information processing component including a plurality of units, comprising:
a program memory unit which has communication paths connected from an input port of said information componet, to an output port of said information processing component, or with others of said plurality of units of said information processing component, for storing a data flow program including execution instructions embodied therein,
a matching unit which has communication paths connected with an input port of said information processing component, with an output port of said information processing component, or with others of said plurality of units of said information processing component wherein operand data that are referred to in an execution of an instruction and which have a same value of tag data indicating that they are in a common context of program execution are matched, paired, and issused to another of said plurality of units of said information processing component, and
an operand data and tag data processing unit which has communication paths connected with an input port of said information processing component, with an output port of said information processing component, or with others of said plurality of units of said information processing component, wherein instructions fetched from said program memory unit, each of which instructions is either an operand data processing instruction or a tag data renewing instruction, are executed to do an operand data processing when the instructions are fetched from the program memory unit are operand data instructions, using those operand data paired by and issued from sid matching unit except when no pairing is needed in executing a single operand instruction, and when the instructions fetched from the program memory unit are tag data renewing instructions to do a tag data processing and then tag data of the token which has been operated on are renewed to a same value as that of at least one successor token input after a token is operated on according to said predetermined numerical sequence in processing a tag data renewing instruction.

17. In a dataflow computer, an information processing appartus which has at least one input port and at least one output port and wherein tokens each having tag data determined according to a predetermined numerical sequence are input into said input port sequentially with respect to time and instructions are executed with respect to said input tokens according to a data flow computation scheme which enables instructions to be executed whenever operand data needed for execution are in a state of readiness comprising:
a token network, and
a plurality of information processing components which is connected with said input port and said output port and has functionality of communication among said information processing components, said input port and said output port passing said input tokens or tokens which are issued from said information processing components as processed tokens,
each said information processing component including a plurality of units, comprising:
a program memory unit which has communication paths connected with an input port of said information processing component, with an output port of said information processing component, or with others of said plurality of units of said information processing component, for storing a data flow program including execution instructions embodied therein,
a matching unit which has communication paths connected with an input port of said information processing component, with an output port of said information processing component, or with others of said plurality of units of said information processing component, wherein operand data which are referred to in an execution of instruction and which have a same value of tag indicating they are in a common context of a program execution are matched, paired, and issued to another of said plurality of units of said information processing component, and
an operand data and tag data processing unit which has communication paths connected with an input port of said information processing component, with an output port of said information processing component, or with others of said plurality of units of said information processing component, wherein instructions fetched from said program memory unit each are either an operand data processing instruction or an tag data renewing instruction and are executed using those operand data paired by and issued from said matching unit except when no pairing is needed in executing a single operand instruction and wherein tag data of the token having been operated on are renewed to a same value as that of at least one successor token input after this token according to said predetermined numerical sequence in processing a tag data renewing instruction.

18. An information processing apparatus in accordance with claim 16 or 17, wherein
said matching unit includes means for matching and pairing two operand data input into said matching unit, each of which has a common destination and a common tag data as the other and means for synthesizing into a single processible data form which includes a pair of said operand data, said common destination, said common tag and issuing said processible data form.

19. An information processing apparatus in accordance with claim 16 or 17, wherein
said information processing component includes an internal network for communication among said token network outside of said information processing component, and to and from said units inside said information processing component.

* * * * *